(12) United States Patent
Adibhatla et al.

(10) Patent No.: US 6,598,195 B1
(45) Date of Patent: Jul. 22, 2003

(54) SENSOR FAULT DETECTION, ISOLATION AND ACCOMMODATION

(75) Inventors: Sridhar Adibhatla, West Chester, OH (US); Matthew William Wiseman, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 550 days.

(21) Appl. No.: 09/643,007

(22) Filed: Aug. 21, 2000

(51) Int. Cl.[7] .............................................. G01R 31/30
(52) U.S. Cl. ........................... 714/745; 714/25; 361/88; 361/93.1
(58) Field of Search ............................ 361/184; 702/65, 702/85; 701/34; 714/745, 25

(56) References Cited

U.S. PATENT DOCUMENTS

| | | | | |
|---|---|---|---|---|
| 5,436,826 A | * | 7/1995 | O'Flarity .................... | 364/184 |
| 5,469,364 A | * | 11/1995 | Hughey et al. ............... | 702/65 |
| 5,864,773 A | * | 1/1999 | Barna et al. .................. | 702/85 |
| 6,208,917 B1 | * | 3/2001 | McKissick, Jr. et al. ...... | 701/34 |
| 6,253,130 B1 | * | 6/2001 | Mergenthaler et al. ....... | 701/34 |

* cited by examiner

Primary Examiner—David Ton
(74) Attorney, Agent, or Firm—William Scott Andes; Barbara Joan Haushalter

(57) ABSTRACT

A sensor in an engineering system can be tested to detect, isolate and accommodate faults. Initially, a modeled sensor value of each actual sensor value is generated as a function of a plurality of other sensors. An absolute value of a difference between the actual sensor value and the modeled sensor value is then computed and compared to a predetermined threshold. A sensor fault is detected if the difference is greater than the predetermined threshold. Once a sensor fault is detected, it is isolated using hypothesis testing and maximum wins strategies. After the fault is isolated, the fault is accommodated by substituting the modeled sensor value for the actual sensor value.

22 Claims, 1 Drawing Sheet

SENSOR FAULT DETECTION, ISOLATION AND ACCOMMODATION

BACKGROUND OF THE INVENTION

The present invention relates to sensor fault detection, isolation and accommodation for all types of engineering systems.

Most engineering systems use sensors to control and monitor the operation of the system. In the case of gas turbine engines, these sensors are used to measure process variables such as rotor speeds, temperatures, pressures, and actuator position feedbacks. The measured variable is then used to ensure that the system is being operated at the desired condition, that safety bounds are being observed, and that performance is being optimized.

Although sensors can be designed to be robust, sensor failure has been addressed by using redundant sensors and backup schemes. More recently, with the advent of digital controllers, analytical schemes for sensor failure detection, isolation, and accommodation (FDIA) have been developed. However, most sensor FDIA schemes are limited to simple range and rate tests. In such tests, sensor values are compared to expected minimum and maximum values and/or rates of change of values. The sensor is declared as faulted if it exceeds its limits. Such methods work for large failures that are very rapid, i.e., "hard" failures. However, in-range failures and slow drift failures, i.e., "soft" failures, are not addressed by such methods.

More sophisticated schemes use an analytical "model" of the sensor, which involves estimating the sensor values based on other inputs, usually other sensors or operating conditions. One such model is a "map model", in which a sensor model of the form $S_c = f(S_a, S_b)$ is used. That is, the value of sensor "c" is assumed to be some reasonably simple function of sensors "a" and "b". Depending on the application, each sensor model can be a function of one or more other sensors. For example, compressor inlet temperature can be modeled as a function of sensed fan inlet temperature and fan speed. Then, a sensor is declared as faulted whenever the difference between the sensor value and its model value exceeds a predetermined threshold.

Regardless of the technique used, the choice of a threshold is meaningful. Too tight a threshold leads to a large number of false alarms (false positives), whereas too large a threshold leads to fewer faults being detected (false negatives). Also, it is generally understood that detecting a fault is easier than isolating it to a specific sensor. Detecting a fault but ascribing it to the incorrect sensor is misclassification.

It would be desirable, then, to provide a method for detection, isolation and accommodation of sensor faults that is aimed at reducing the detection threshold as compared to current methods. It would further be desirable to achieve sensor FDIA while maintaining low rates of false positives, false negatives and misclassifications.

BRIEF SUMMARY OF THE INVENTION

To detect, isolate and accommodate sensor faults, a method is proposed that is based on the use of sensor-consistency models, hypothesis testing, and maximum-wins strategy. This method maximizes the number of correct isolations and minimizes the number of false positives.

Accordingly, the present invention provides a method for sensor fault detection, isolation and accommodation with a reduced detection threshold.

DETAILED DESCRIPTION OF THE INVENTION

Figure 1:
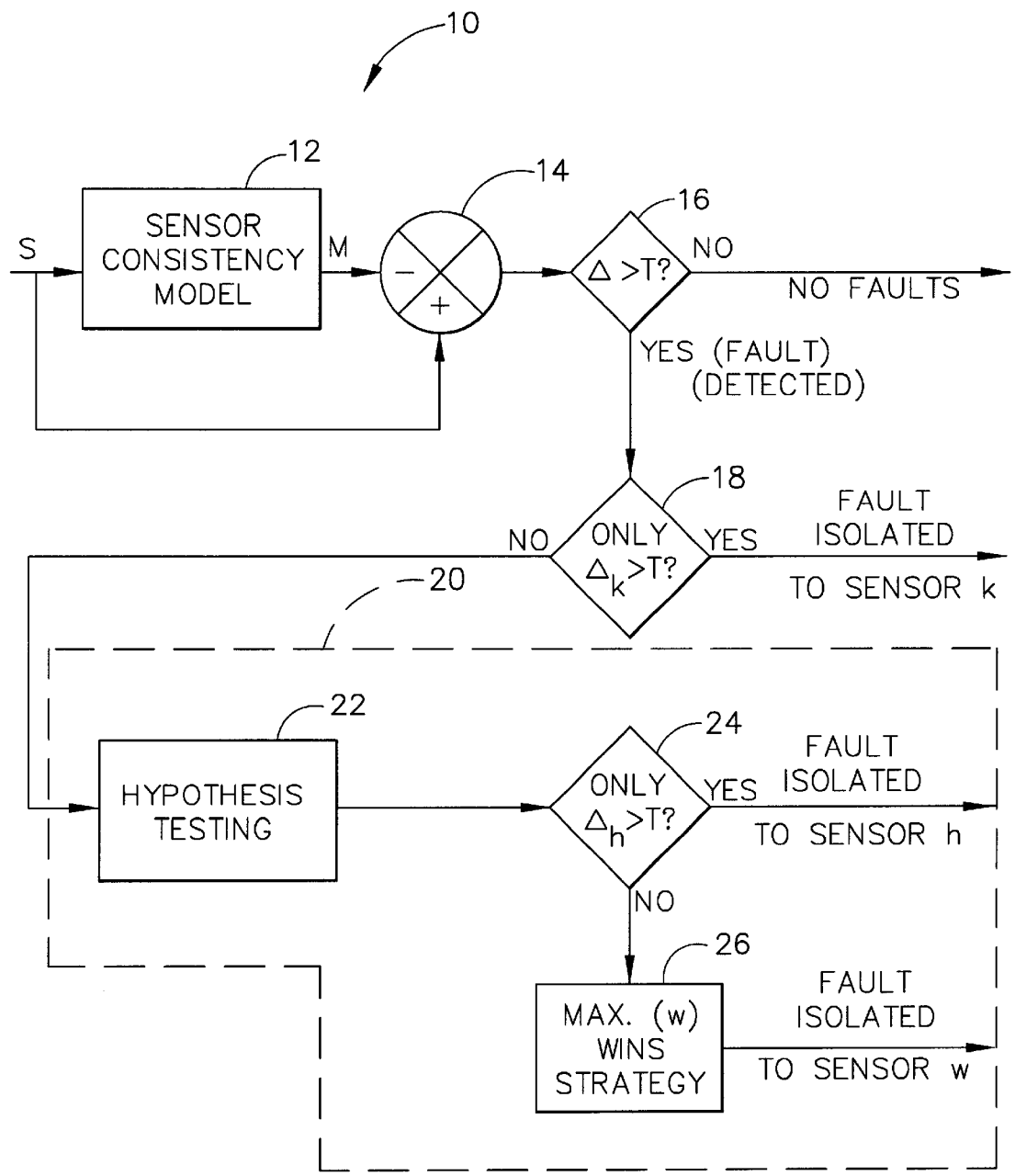
FIG. 1 is a schematic block diagram of sensor fault detection, isolation and accommodation.

Referring to FIG. 1, there is a schematic block diagram 10 illustrating a method for the detection, isolation and accommodation of sensor faults. A consistency model 12 models each sensor S as a function of the remaining sensors. For example, compressor inlet temperature can be modeled as a function of sensed rotor speeds, pressures, and the remaining temperature sensors. In FIG. 1, the absolute value of the difference, delta, between the actual sensor value S and the modeled sensor value M is computed at block 14.

In an exemplary embodiment, the sensor consistency model is a linear model of the form:

$$\begin{bmatrix} M1 \\ M2 \\ \ldots \\ \ldots \\ Mn \end{bmatrix} = \begin{bmatrix} 0 & R12 & \ldots & \ldots & R1n \\ R21 & 0 & \ldots & \ldots & R2n \\ \ldots & \ldots & 0 & \ldots & \ldots \\ \ldots & \ldots & \ldots & 0 & \ldots \\ Rn1 & Rn2 & \ldots & \ldots & 0 \end{bmatrix} \begin{bmatrix} S1 \\ S2 \\ \ldots \\ \ldots \\ Sn \end{bmatrix}$$

In this linear model, S1, S2, ..., Sn refer to the "n" actual sensor values, such as rotor speeds, pressures, and temperatures.; M1, M2, ..., Mn refer to the "n" modeled sensor values; and Rij refers to the i-th row, j-th column element of the linear model matrix R.

The linear model matrix R has zeros on the main diagonal, indicating that the modeled sensor values are not functions of the corresponding actual sensor values. The designer may choose to make other elements of the matrix zero, in order to lead to other column-canonical forms.

The matrix R is obtained by a linear regression scheme applied to "training" data comprised of sensor values for a large number of simulated or actual plant conditions. If the number of plant conditions simulated is r, and the number of sensors is n, then a multiple linear regression solution provides the non-zero elements of the i-th row of the regressor matrix R using the formula:

$Ri = X \backslash Xi$

Where X is an (n−1) by r matrix of sensor values, which is all the sensors except the one being modeled; Xi is a 1 by r vector of values for the sensor being modeled; and \ is the pseudo-inverse operator denoting a least-squares solution to Xi=XR.

In a typical implementation, data can be collected at a single operating condition, or even a multiplicity of operating conditions or operating regimes. The linear regressor matrix described above is a one-time or snapshot scheme for estimating sensor values. In a more general embodiment of the invention, the single regressor matrix can be replaced by a series of matrices from which the appropriate matrix is selected, depending on the operating regime. Alternatively, the single regressor matrix can be replaced by a matrix of constants or a matrix with elements gain-scheduled as a function of the operating condition. The operating conditions can include steady state and/or transient conditions. Also, weighted least-squares can be used in place of the least-squares solution described above, with weights chosen on the basis of reliability or transient characteristics of the sensors.

In another alternative embodiment, the linear model is replaced by a nonlinear model, such as a neural network. This has the potential of increasing modeling accuracy, thereby reducing threshold values. However, the failure detection and isolation strategies remain unchanged.

In yet another embodiment, the sensors are divided into two sets. The modeled values of sensors from one set are computed as functions of the other set only. That is, sensors in set A are modeled as functions of sensors in set B, and sensors in set B are modeled as functions of sensors in set A. This leads to an R matrix that is a 2×2 block diagonal, with zero blocks on the diagonal and nonzero blocks as the off-diagonal terms. Various means for dividing the sensors into two sets include putting a fraction, such as half, of the sensors in one set, with the remaining sensors in the other set. The sensors in each set are chosen to maximize model accuracy while minimizing the probability of failure of more than one sensor from the same set. Alternatively, in a dual-channel system, sensors from channel A can be in one set, and sensors from channel B can be in the other set. In yet another embodiment, the actuator and environmental sensors can be in one set and the remaining sensors such as speeds, temperatures and pressures can be in another set. In this embodiment, the sensor fault isolation does not require hypothesis testing and maximum wins steps. A failed sensor in set A (B) is identified by a large error (sensed value minus model value) for the failed sensor in set A (B), and all or most of the sensors in set B (A). Those skilled in the art will also realize that multiple other schemes, including more general block-diagonal schemes, are also possible.

Continuing with FIG. 1, a decision unit 16 compares the difference, delta, to a predefined threshold T. This threshold is nominally set equal to four times the standard deviation of the modeling error, which is the difference between the actual sensor value and the modeled sensor value for the data used to develop the sensor consistency model. The threshold value can be changed (increased or decreased) to trade the number of false positives (detecting a fault when there is no fault) with the number of false negatives (missing a fault). This threshold is determined by the designer when the system is being created and tested. The value of the threshold will remain fixed once the system is implemented. Alternatively, the threshold could be a function of the operating conditions, such as power level, inlet temperature, or inlet pressure, in which case the value of the threshold changes automatically.

If the difference at decision block 16 shows the difference, delta, to be less than the threshold T, no faults are detected. If, in fact, a fault exists, the lack of detection is a false negative. If the difference is greater than T, the program continues to decision block 18, and the sensor is declared to be potentially faulted. This process is repeated for each of the n sensors. If one or more sensors are declared as potentially faulted, a fault is considered to be detected. If, in fact, there is no fault, this detection is a false positive. If, at decision block 18, the fault can be isolated to a single sensor, there is no need for further fault isolation, and the process ends. However, if more than one sensor is declared as potentially faulted, fault isolation logic is used to distinguish the faulted sensor from the remaining, unfaulted, sensors.

Fault isolation logic is depicted by portion 20 of FIG. 1. First, hypothesis testing is performed at block 22 on each of the sensors that was declared as potentially faulted. This testing involves hypothesizing that a specific sensor h is faulted, and replaces the actual value of the sensor with the modeled value of the sensor. The program then repeats the process of blocks 12, 14, and 16. If the number of potentially faulted sensors out of block 16 drops to zero, the hypothesis that sensor h is faulted is confirmed, and the corresponding sensor h is declared as still being potentially faulted.

If only one sensor is declared as still being potentially faulted, as determined at decision block 24, there is no need for further isolation, and the hypothesis testing process ends. If more than one sensor is declared as still being potentially faulted, the sensor differences, delta, are normalized to account for the variation in magnitude among the sensor values. At block 26, a max-wins strategy is used that determines which sensor w has the maximum normalized error, and declares that sensor to be faulted.

A faulted sensor cannot be relied upon to provide an accurate measurement, so the faulted sensor value is discarded, and cannot be used by the controller. If the faulted sensor cannot be accommodated, that is, a replacement value computed for the faulted sensor, the controller will become degraded and the system performance will deteriorate. Sensor accommodation comprises substituting the value of the faulted sensor by its model, as obtained from the sensor consistency model of block 12. For accommodation purposes, however, an alternate model value can be used. The sensor consistency model is used to determine which sensor is faulted. Once that is known, other models can be applied for accommodation that do not depend on the faulted sensor as input but can compute its value as output.

With the present invention, each sensor model of block 12 is a function of several sensors, rather than one or two other sensors. Therefore, the modeled sensor is very accurate, which reduces detection threshold values and provides more accurate values for accommodation in the event of a sensor fault. Due to accuracy of the sensor consistency model of block 12 combined with the hypothesis testing at block 22 and maximum wins strategy of block 26, the number of correct isolations is high and the number of false positives is low.

While the invention has been described with reference to a preferred embodiment, it will be understood by those skilled in the art that various changes may be made and equivalents may be substituted for elements thereof without departing from the scope of the invention. For example, this design can be applied in various environments to various components. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting sensor faults in a system, the method comprising the steps of:

generating a modeled sensor value of each actual sensor value as a function of a plurality of other sensors;

computing an absolute value of a difference between the actual sensor value and the modeled sensor value;

comparing the difference to a predetermined threshold; and declaring the sensor as faulted if the difference is greater than the predetermined threshold.

2. A method as claimed in claim 1 wherein the plurality of other sensors comprises all sensors except the sensor being modeled.

3. A method as claimed in claim 1 wherein the plurality of other sensors comprises a subset of all sensors.

4. A method as claimed in claim 1 wherein the step of generating a modeled sensor value comprises the step of applying a linear model matrix.

5. A method as claimed in claim 1 wherein the step of generating a modeled sensor value comprises the step of applying a nonlinear model.

6. A method of detecting and isolating sensor faults in a system, the method comprising the steps of:
generating a modeled sensor value of each actual sensor value as a function of a plurality of other sensors;
computing an absolute value of a difference between the actual sensor value and the modeled sensor value;
comparing the difference to a predetermined threshold;
declaring the sensor as faulted if the difference is greater than the predetermined threshold; and
applying fault isolation to the potentially faulted sensor.

7. A method as claimed in claim 6 wherein the plurality of other sensors comprises all sensors except the sensor being modeled.

8. A method as claimed in claim 6 wherein the plurality of other sensors comprises a subset of all sensors.

9. A method as claimed in claim 6 wherein the step of generating a modeled sensor value comprises the step of applying a linear model matrix.

10. A method as claimed in claim 6 wherein the step of generating a modeled sensor value comprises the step of applying a nonlinear model.

11. A method as claimed in claim 6 wherein the step of applying fault isolation comprises the steps of:
performing hypothesis testing on the potentially faulted sensor; and
performing maximum wins strategies on the potentially faulted sensor.

12. A method as claimed in claim 11 wherein the step of performing hypothesis testing comprises the steps of:
hypothesizing that each sensor is faulted in turn; and
concluding that the hypothesis is correct if replacing the sensor's value by its associated modeled sensor value and then repeating fault detection causes subsequent faults detected to decrease.

13. A method as claimed in claim 11 wherein the step of performing maximum wins strategies comprises the steps of:
computing a normalized error; and
isolating fault to a sensor with a largest normalized error when the step of performing hypothesis testing indicates more than one sensor as being faulted.

14. A method of detecting, isolating and accommodating sensor faults in a system, the method comprising the steps of:
generating a modeled sensor value of each actual sensor value as a function of a plurality of other sensors;
computing an absolute value of a difference between the actual sensor value and the modeled sensor value;
comparing the difference to a predetermined threshold;
isolating the sensor as potentially faulted if the difference is greater than the predetermined threshold; and
accommodating the sensor fault by substituting the actual sensor value of the faulted sensor with its modeled sensor value.

15. A method as claimed in claim 14 wherein the plurality of other sensors comprises all sensors except the sensor being modeled.

16. A method as claimed in claim 14 wherein the plurality of other sensors comprises a subset of all sensors.

17. A method as claimed in claim 14 wherein the step of generating a modeled sensor value comprises the step of applying a linear model matrix.

18. A method as claimed in claim 14 wherein the step of generating a modeled sensor value comprises the step of applying a nonlinear model.

19. A method as claimed in claim 14 wherein the step of isolating the sensor comprises the steps of:
performing hypothesis testing on the potentially faulted sensor; and
performing maximum wins strategies on the potentially faulted sensor.

20. A method as claimed in claim 19 wherein the step of performing hypothesis testing comprises the steps of:
hypothesizing that each sensor is faulted in turn; and
concluding that the hypothesis is correct if replacing the sensor's value by its associated modeled sensor value and then repeating fault detection causes subsequent faults detected to decrease.

21. A method as claimed in claim 19 wherein the step of performing maximum wins strategies comprises the steps of:
computing a normalized error; and
isolating fault to a sensor with a largest normalized error when the step of performing hypothesis testing indicates more than one sensor as being faulted.

22. A method as claimed in claim 14 wherein modeled sensor value used for sensor accommodation can differ from the modeled sensor value used for detection.

* * * * *